Sept. 1, 1931. R. J. WENSLEY ET AL 1,821,368
SUPERVISORY CONTROL SYSTEM
Filed May 19, 1923  9 Sheets-Sheet 7
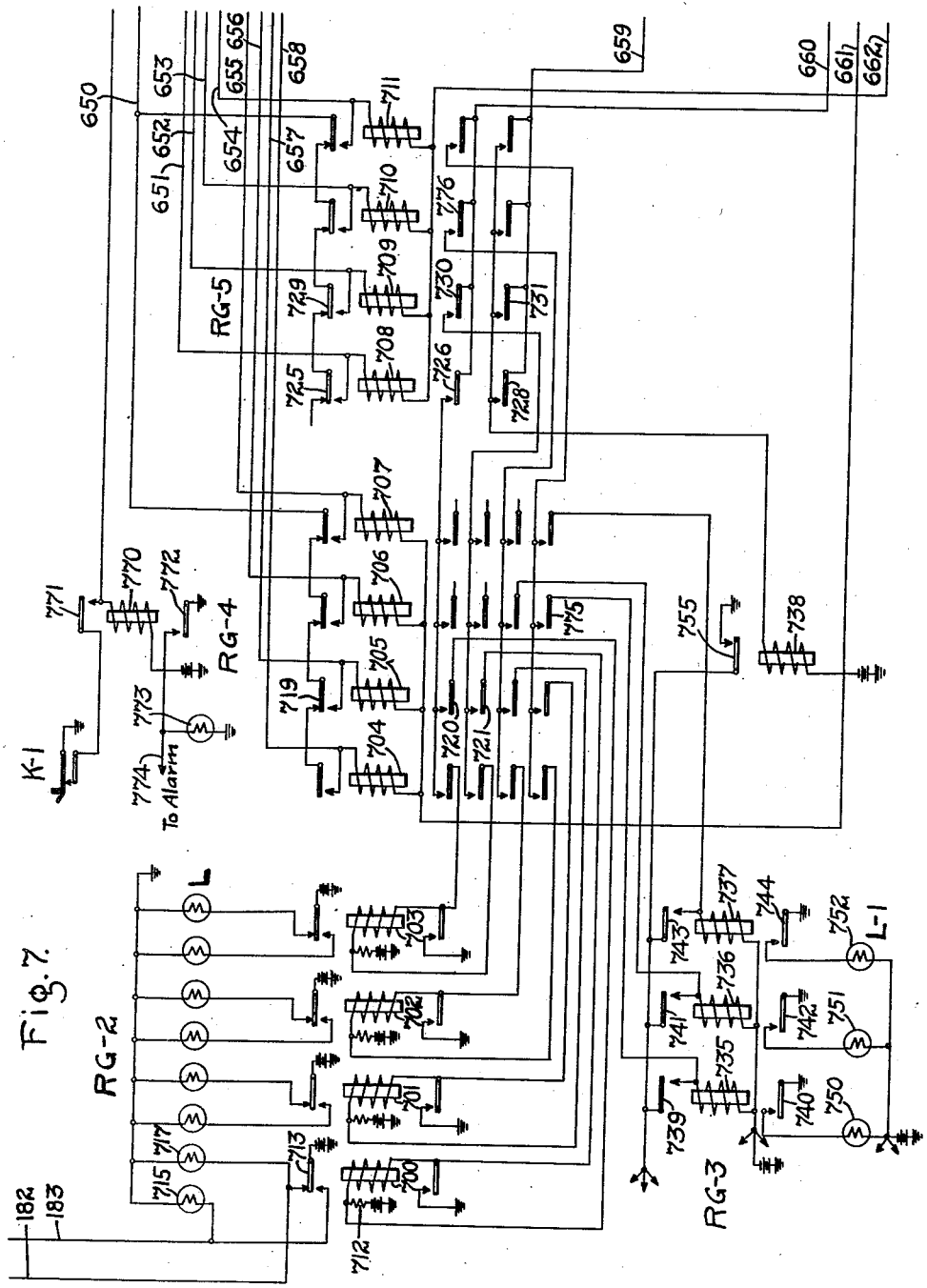
WITNESSES:
INVENTORS
Roy J. Wensley &
James L. McCoy.
BY
ATTORNEY

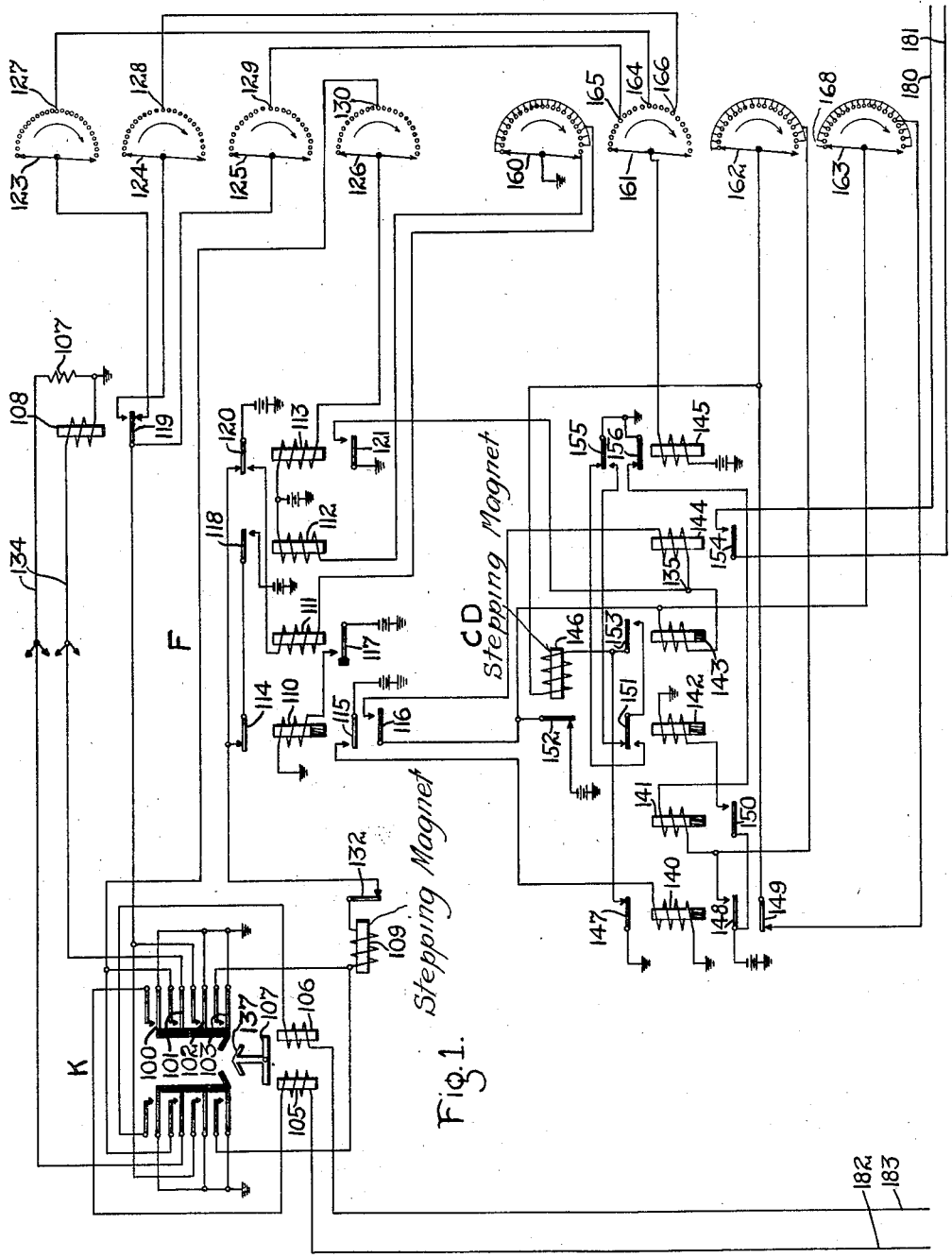

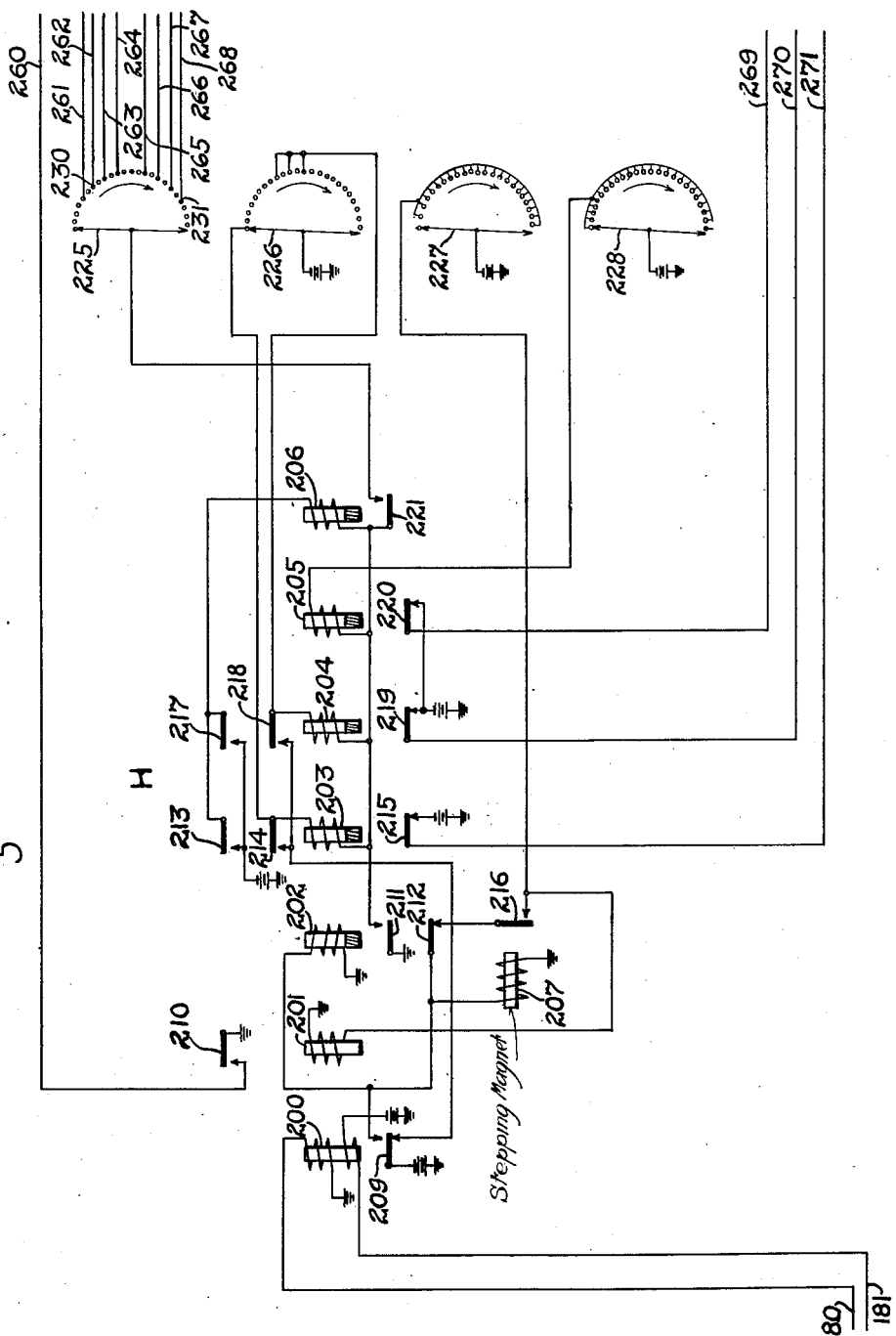

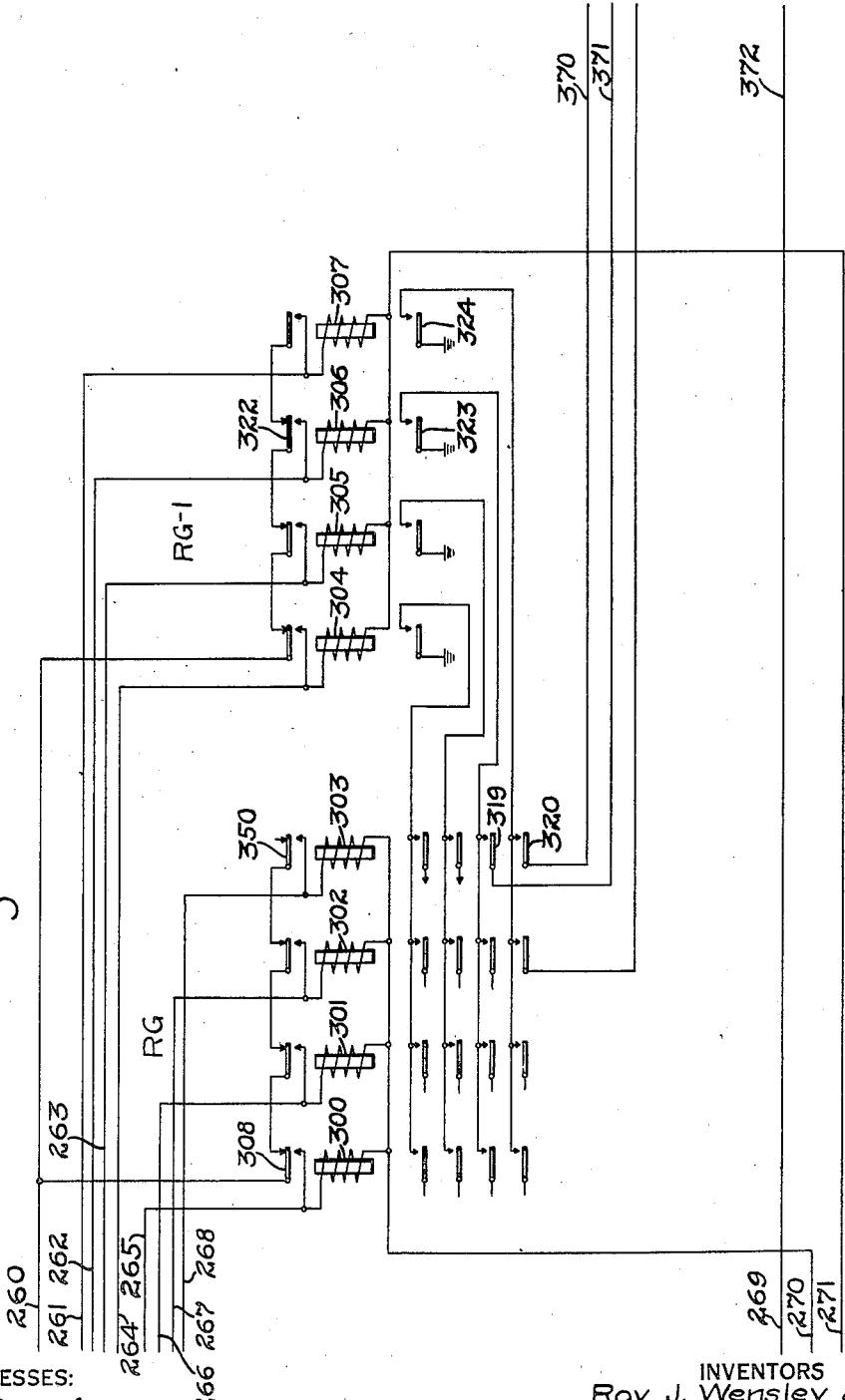

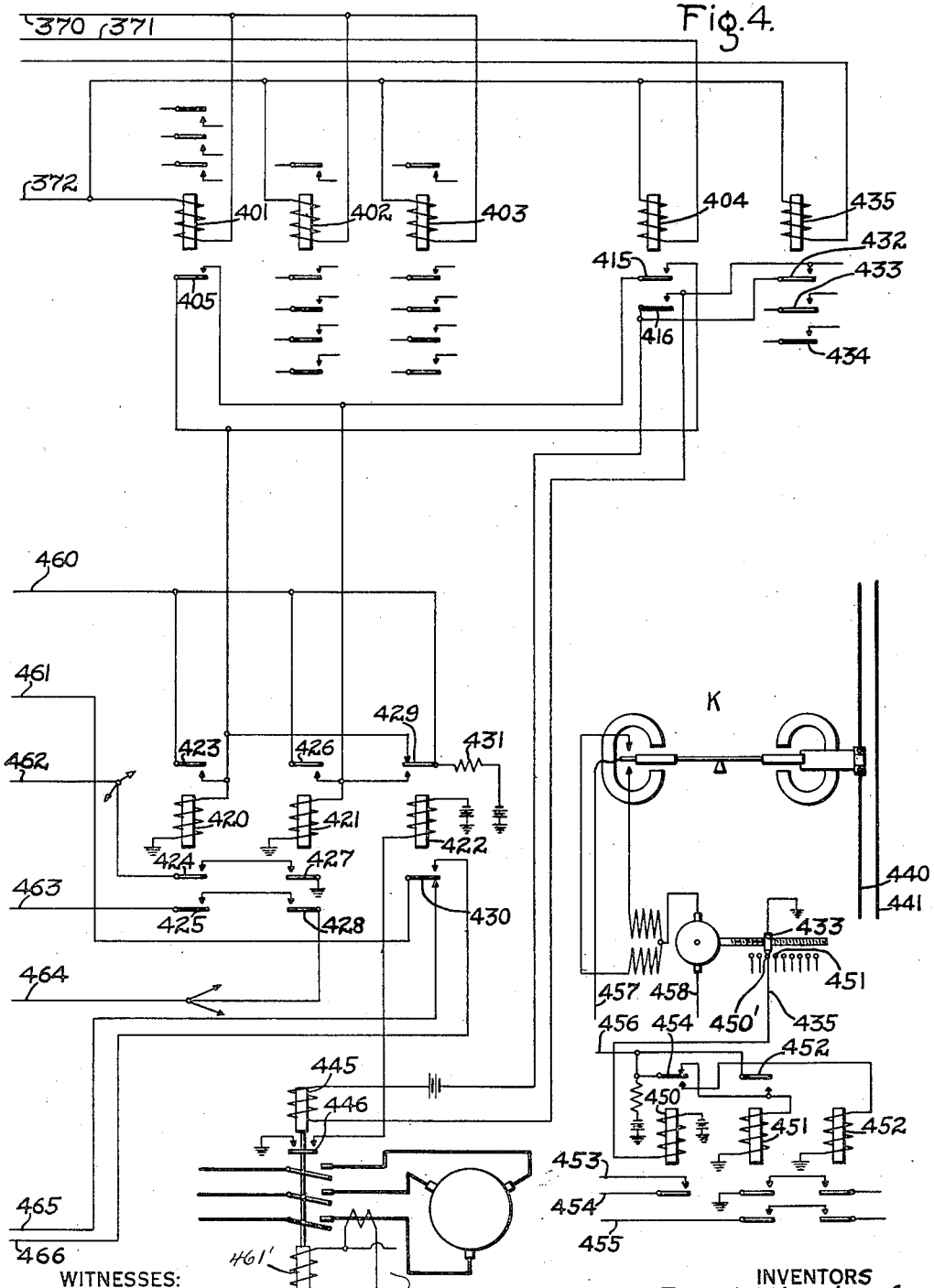

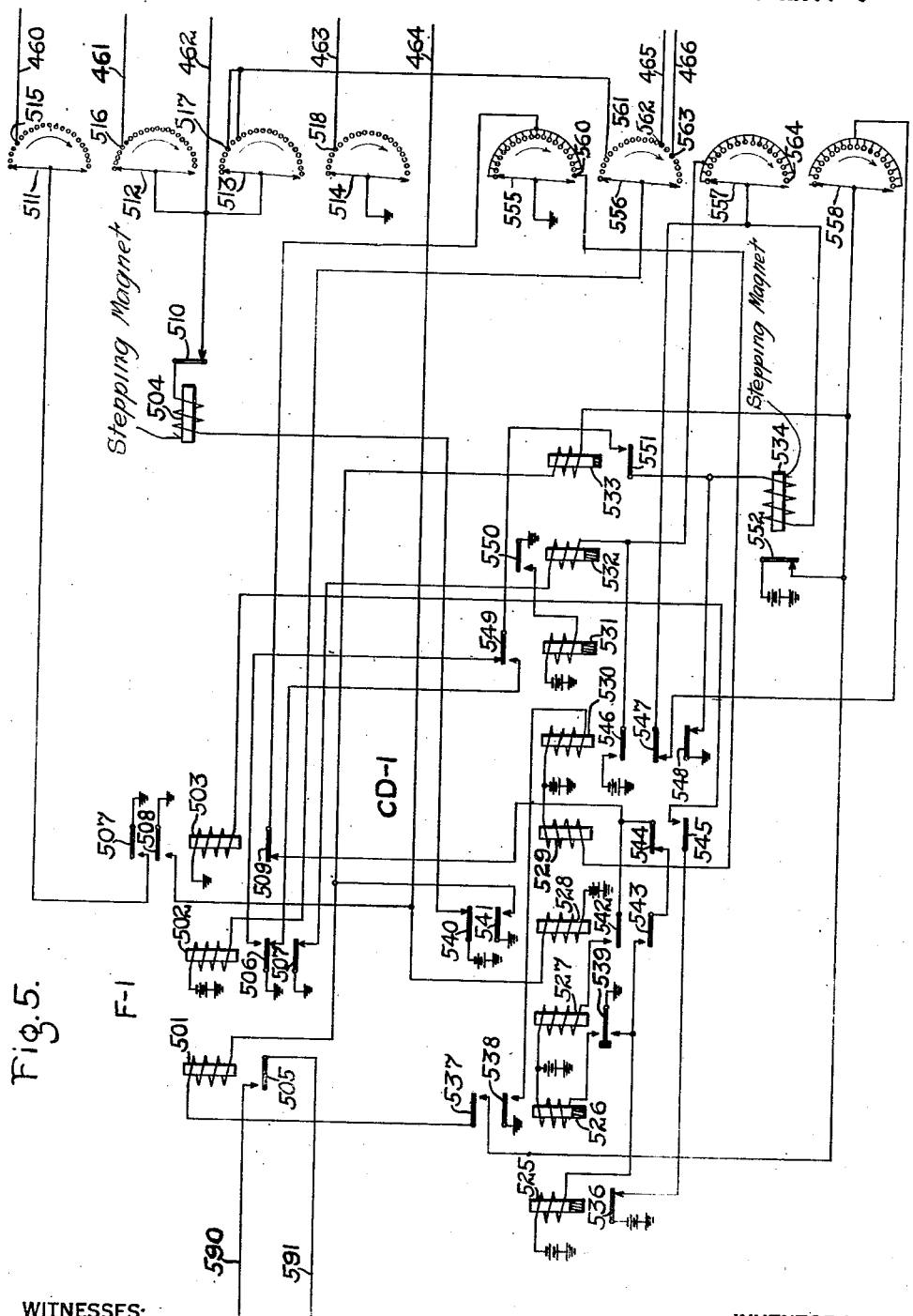

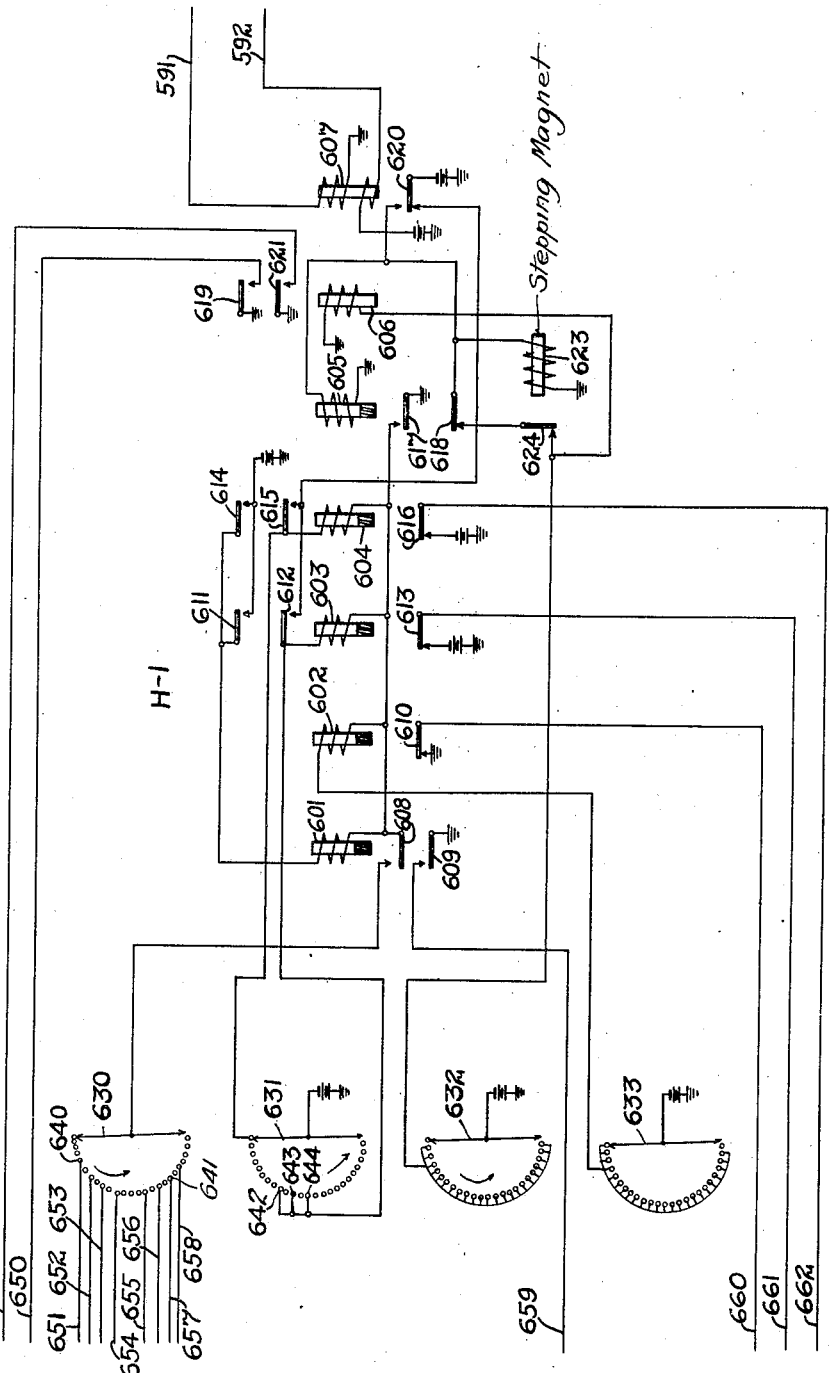

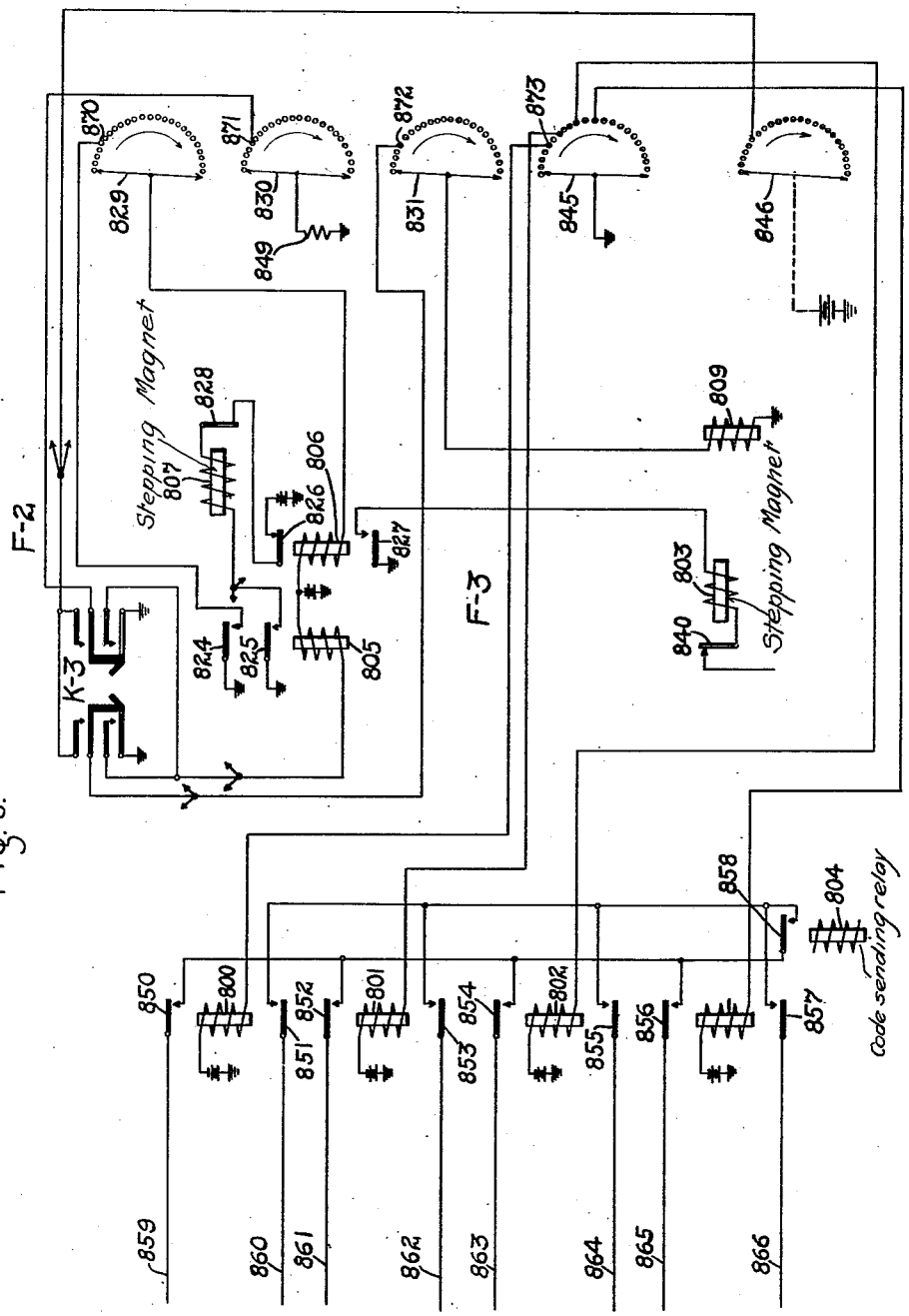

Sept. 1, 1931.   R. J. WENSLEY ET AL   1,821,368
SUPERVISORY CONTROL SYSTEM
Filed May 19, 1923   9 Sheets-Sheet 9

WITNESSES:
R. J. Butler.

INVENTORS
Roy J. Wensley &
James L. McCoy.
BY
Wesley G. Carr
ATTORNEY

Patented Sept. 1, 1931

1,821,368

UNITED STATES PATENT OFFICE

ROY J. WENSLEY, OF EDGEWOOD, AND JAMES L. McCOY, OF WILKINSBURG, PENNSYLVANIA, ASSIGNORS TO WESTINGHOUSE ELECTRIC & MANUFACTURING COMPANY, A CORPORATION OF PENNSYLVANIA

SUPERVISORY CONTROL SYSTEM

Application filed May 19, 1923. Serial No. 640,001.

Our invention relates, in general, to systems for supervising and controlling electrical equipment from a remote point and more particularly to the supervising and controlling of substations in an electrical system of distribution.

The broad general object of our invention is the provision of novel and efficient circuit arrangements for remotely controlling power units in substations. That is, we have made provisions whereby a load dispatcher located at a central point or control office or station may supervise and control all power or apparatus units in the substations of a complex electrical distributing system. These substations may be of the manual or automatic type.

In the present instance, we have shown our invention applied to an electrical system of distribution having automatic substations, though it is by no means limited to this use.

In accordance with out invention, we have provided a group of supervisory lamps and controlling keys for each substation to be used for supervising and controlling the operation of power units therein. There is a two-wire trunk line connecting the dispatcher's office to each substation. Associated with each end of each trunk line is a directively controlled automatic switch. Also, in each substation, there is an automatic sending equipment associated with the trunk line. In the dispatcher's office, an automatic impulse sending device is provided which is controlled by the operation of said keys.

In brief the operation proceeds as follows: When one of the apparatus units at a substation changes its condition, under automatic control, the automatic impulse sender in the substation operates to send series of impulses over the trunk line in accordance with the apparatus unit operated. Responsive to these operations, the automatic directively controlled switch, associated with the trunk line in the dispatcher's office, is operated to control the operation of the supervisory signals. The operation of these signals serves to apprise the dispatcher of the operation of the apparatus unit. In order to operate an apparatus unit in any substation, the dispatcher operates a key corresponding to the operation of the apparatus unit desired. This operation causes the trunk line leading to the desired substation to be associated with the automatic impulse sending device in the dispatcher's office. The device then automatically functions to send a code of impulses over the trunk line to operate the directively controlled switch in the selected substation. As a result of the operation of the switch, the proper apparatus unit is controlled, as desired, by the dispatcher.

In carrying out our invention, we have produced many new features, some of which will be mentioned below.

One of the features of our invention resides in the provision of an automatic sender in the dispatcher's office which is common to all the trunk lines extending to the various substations.

Another feature of the invention resides in the provision of special load indicating arrangements whereby the dispatcher is apprised of the load on each substation.

Still another feature of our invention provides means for operating an automatic switch at each end of a two conductor trunk line simultaneously.

There are other objects of our invention, which, together with the above, will be described hereinafter with reference to the accompanying drawings.

Referring now to the drawings, comprising Figures 1 to 9, inclusive, we have shown by means of the conventional diagrams sufficient of the circuits and apparatus to enable our invention to be readily explained and understood.

Figures 1 to 7, inclusive, when placed side by side with the corresponding lines at the ends thereof in alinement, show circuit drawings of our complete system. The circuit drawings in Figures 1, 6 and 7 are drawings of the equipment located in the load dispatcher's office, while Figs. 2, 3, 4 and 5 are drawings of the selective and controlling equipment in an automatic substation.

Figs. 8, 9 and 10 are similar views of modifications of our invention.

Referring now more specifically to Fig. 1, in the upper left-hand corner there is shown a key K. This key is one of several groups of keys and is of the double throw electromagnetically latched type. The switch F is a finder switch of the usual rotary type, the wipers of which move in a forward direction only. The finder switch is provided with four wipers 123 to 126, inclusive, each of which is adapted to engage a contact bank comprising twenty five contact members. The wipers of the switch F have no normal position. The mechanical construction of the finder switch F is similar to that shown in Clement Patent No. 1,107,153. The switch CD is a code sending switch similar in mechanical construction to the finder switch F. On account of differences in circuit design, the switch CD is rotated to normal at the end of each operation.

In Fig. 2 there is shown a connector switch H. This switch is of the same mechanical construction as the finder switch F. However, its circuits have been so designed as to enable it to be directively controlled.

Fig. 3 shows two relay groups RC—1 and RG. These are selecting relays, the relay group RG—1 being the tens selecting group and the relay group RG being the units selecting group.

The relays 401 to 404, inclusive, in Fig. 4, are relays selected by the operation of the selective relays of Fig. 3. The contactor 445 may be any one of the contactors in the substation. The relays 420 to 422, inclusive, are provided for the purpose of controlling the operation of the finder switch F—1 of Fig. 5, in accordance with the position of the contactor 445. At K is shown a well known Kelvin balance type ammeter which is connected to an ammeter shunt of the direct current supply busses 440 and 441 and operates to shift the contact maker 433 in accordance with the voltage across the bus.

In Fig. 5 is shown a finder switch F—1 and a code sending switch CD—1. These switches are very similar to the switches F and CD previously described.

At H—1, Fig. 6, is shown a connector switch similar to the connector switch H above described.

The relay groups RG—4 and RG—5, shown in Fig. 7, are selective relays similar to those shown at RG and RG—1, Fig. 3. The relays 700 to 703, inclusive, comprising group RG—2, are relays for controlling the operation of the supervisory lamps L. The relay group RG—3 comprises relays for controlling the load indicating lamps L—1.

In Fig. 8, we have shown a modification of our invention for selecting a trunk line leading to any one of a number of substations. The finder switches F—2 and F—3 are similar in mechanical construction to the finder switch F shown in Fig. 1. While the circuits of the finder switch F—3 have only been indicated, it will be understood that these circuits are similar, except where shown, to the circuits of the finder switch F.

Figure 10:
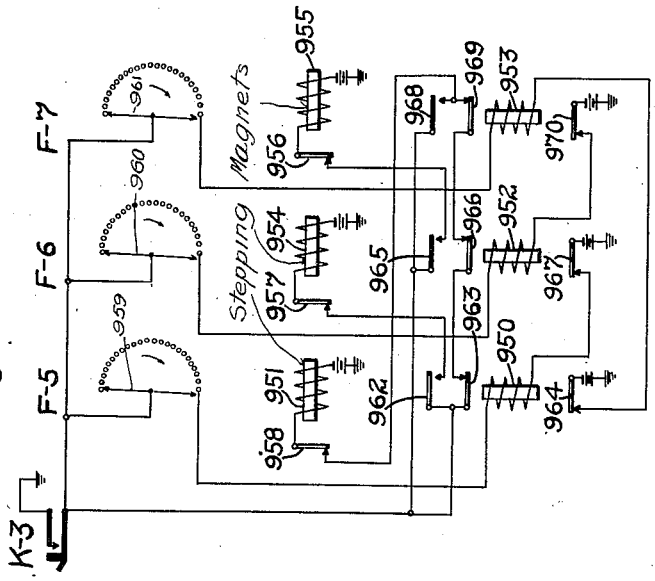
Fig. 10 shows an arrangement for increasing the number of keys that may be selected by using a plurality of finder switches.

Having briefly described the apparatus shown in the drawings, we will now describe its detailed circuit operation. In order to do this, it will be assumed that the contactor 445 closes. The closing of the contactor 445 may occur in response to certain conditions brought about by the operation of the ordinary automatic controlling equipment of the substation. This equipment has not been shown in the drawings, as it is well known.

When the contactor 445 operates, a circuit is closed which may be traced from ground by way of the spring 446, and through the winding of the relay 422 to battery. The relay 422 is energized by this circuit and, upon operating, its armature 429 closes a circuit for the relay 421. The relay 421 is energized and attracts its armatures. Prior to this time, the relay 420 has been energized as a result of the relay 422 being inoperative. When the relay 422 was energized, the relay 420 did not retract its armatures, due to the fact that it had established a locking or holding circuit for itself at armature 423.

When the relay 421 is energized, it operates to establish a locking circuit for itself at armature 426 and to close a circuit which may be traced as follows: From ground by way of the armature 427 and its front contact, the front contact and the armature 424, the common conductor 462, the back contact and the armature 510, through the winding of the stepping magnet 504, and thence to the battery by way of the back contact member and the armature 540 of the relay 528. The stepping magnet 504 is immediately energized to place its pawl in position to actuate the switch shaft upon its deenergization and, at armature 510, opens its own circuit. As the magnet 504 interrupts its own circuit, it intermittently operates to advance the switch wipers 511 to 514, inclusive, step by step, until said wipers are brought into engagement with the bank contact members 515 to 518, inclusive. In this position, a circuit is completed extending from ground by way of the wiper 514 and its associated bank contact 518, the conductor 463, the armature 425 and its front contact, the front contact and the armature 428, the common conductor 464, and through the winding of the relay 528 to the battery. The relay 528 is immediately operated over this circuit.

As a result of the energization of the relay 528, the circuit of the stepping magnet 504 is opened at armature 540 and, at armature 541, a circuit is completed which extends from ground by way of the said armature and its front contact, through the winding of the slow-releasing relay 533, and thence to the battery by way of the back contact and the armature 552. Another result of the energization of the relay 528 is that a circuit is closed through ground by way of the wiper 555 and its associated bank contact, the armature 509 and its back contact, the armature 542 and its front contact, and through the winding of the relay 527 to the battery. Another circuit in multiple with the above, except that it goes by way of the armature 544 and its back contact and the armature 543 and its front contact, may be traced for energizing the relay 525. The relay 527, upon operating, at its armature 539 closes a circuit for the relay 526.

At this point, it might be well to mention the peculiar construction of the armature 539 of the relay 527. The armature 539 is weighted and is so constructed that, when the relay 527 is deenergized, the armature 539 vibrates for some time on account of its momentum. The adjustment between the front and back contacts is so made that the armature 539, in decreasing the amplitude of its operation, first permanently opens the circuit of the relay 525. The operation of the relay 525 is without particular function at the present time. The relay 526, upon operating, at its armature 538 closes a circuit for the relay 530 and at its armature 537 establishes a circuit which extends from ground by way of the armature 541 and its front contact, through the winding of the repeating relay 501, the armature 537 and its front contact, and thence to battery, by way of the back contact and the armature 552 on the stepping magnet 534 of the code sending switch CD—1.

The relay 530 is energized from the previously traced circuit and, upon operating, it closes a circuit at armature 546, which extends from the battery, by way of the front contact and the armature 546, through the winding of the slow-releasing relay 532, and thence to ground, by way of the back contact and the armature 507. The relay 532, upon operating, at armature 550 closes a circuit for the slow-releasing relay 531. By the operation of the relay 531, a circuit is completed which extends from ground by way of the armature 506 and its back contact, the front contact and the armature 549, the front contact and the armature 551, through the winding of the magnet 534, the wiper 557 and its associated bank contact, and thence to battery, by way of the armature 546 and its front contact. The magnet 534 is energized over this circuit and operates to place its pawl in such position as to operate the switch shaft upon its deenergization. Another result of the energization of the magnet 534 is that the circuit of the slow-releasing relay 533 is opened as is, also, the circuit of the repeating relay 501.

When the circuit of the relay 501 is closed, as previously described, this relay operates. As a result of this operation, a circuit is closed over the trunk conductors 590 and 591 for the line relay 607 of the connector switch H—1. Upon operating, the relay 607, through its armature 620 completes a circuit for the slow-releasing relay 605 in multiple with the stepping magnet 623. Upon attracting its armatures, the relay 605 closes a circuit for the slow-releasing relay 604 at its armature 617 from ground over armature 617 and its front contact to the winding of the relay 604 and over the first contact and wiper 631 through battery to ground. The relay 604, upon operating its armature 615, prepares a holding circuit for itself, removes battery from the conductor 662 at the armature 616, and at the armature 614, closes a circuit for the slow releasing relay 601. The energization of the relay 601 merely prepares certain circuits which function later. The energization of the magnet 623 places its pawl in position to operate the switch shaft upon the deenergization of the magnet.

Now when the circuit of the repeating relay 501 in the code sending switch CD—1 is opened by the energization of the magnet 534, previously described, this relay is deenergized to open the circuit of the line relay 607 of the connector H—1. The deenergization of the line relay 607 opens the circuit of the slow-releasing relay 605 and also the circuit of the magnet 623. The retraction of the armature of the magnet 623 causes its associated pawl to advance the switch shaft carrying the switch wipers 630 to 633, inclusive, into engagement with the first set of bank contacts. The operation of the connector H—1 from its normal position closes a circuit for the relay 606 from ground through the winding of the relay 606 and over the second to twenty-fifth contact and wiper 632 to battery and ground. The relay 606, upon operating, places ground upon the conductor 650 at the armature 619 and, at the armature 621, closes a circuit for the relay 770. The relay 770, upon attracting its armatures, closes a locking circuit for itself at the armature 771 and at the armature 772 closes a circuit for an audible alarm (not shown) and the alarm lamp 773. The attention of the load dispatcher is thus drawn to the fact that an operation has been performed at the substation.

Referring now to the code sending switch CD—1, it will be remembered that the energization of the stepping magnet 534 also opened the circuit of the slow-releasing relay 533. After a short interval, this relay deenergizes and opens the circuit of the stepping magnet 534 at armature 551. The magnet 534 immediately deenergizes to advance the wipers 555 to 558, inclusive, into engagement with the first set of bank contacts and, at armature 552, closes the circuit of the repeating relay 501 and also the circuit of the relay 533. The relay 533 energizes to close the circuit of the stepping magnet 534 and the repeating relay 501 energizes to close the circuit of the line relay 607 to the connector H—1. The alternate operation of the slow-releasing relay 533 and the stepping magnet 534 continues until the wipers 555 to 558, inclusive, are brought into engagement with the bank contact set which includes the contact 561. When this occurs, a circuit is completed extending from ground by way of the armature 427 and its front contact, the front contact and the armature 424, the common conductor 462, the wiper 513, the bank contact 517, the bank contact 561, the wiper 556, and through the winding of the relay 502 to battery.

The relay 502 is energized over this circuit and operates at armature 506 to open the circuit of the stepping magnet 534 and to prepare another circuit at the front contact of this armature for the said magnet. An additional result of the operation of the relay 502 is that the circuit of the slow-releasing relay 532 is opened at armature 507. After a short interval of time, the relay 532 is deenergized to open the circuit of the slow-releasing relay 531. Upon the retraction of the armature 549 of the relay 531, a circuit is completed which extends from ground by way of the armature 506 and its front contact, the back contact and the armature 549, the front contact and the armature 551, through the winding of the stepping magnet 534, the wiper 557 and its associated bank contact, and thence to the battery, by way of the armature 546 and its front contact.

The magnet 534 is energized over this circuit and actuates its armatures, to position its associated pawl, to open the circuit of the slow-releasing relay 533, and also to open the circuit of the repeating relay 501. The slow-releasing relay 533 is deenergized, after an interval, to open the circuit of the stepping magnet 534, which is deenergized, to again close the circuit of the slow-releasing relay 533 and to open the circuit of the repeating relay 501. The alternate operation of the relay 533 and the magnet 534 again occurs until the wipers 555 to 558, inclusive, are advanced into engagement with the bank contact set which includes the bank contact 563.

During the operation of the code sending switch CD—1, while its wipers were rotated in search of the contact set which includes the bank contact 561, the circuit of the relay 501 was intermittently opened and, consequently, the circuit of the line relay 607 of the connector H—1. It is true that the circuit of the slow-releasing relay 533 indirectly controls the speed of the operation of the repeating relay 501. It is also true that at each deenergization of the relay 607, the circuit of the slow-releasing relay 605 is opened. In order to obviate any false operation, which would occur were the relay 605 to be deenergized between deenergizations of the relay 533 in the switch CD—1, the time constant of the slow-releasing relay 533 is a good deal faster than the time constant of the slow-releasing relay 605.

Each time the circuit of the line relay 607 is opened, this relay is deenergized to open the circuit of the slow-releasing relay 605 and also the circuit of the stepping magnet 623. The magnet 623 is thus deenergized a plurality of times to advance the wipers 630 to 631, inclusive, into engagement with the bank contact set which corresponds to the number of impulses sent over the trunk line, as determined by the number of steps that the code sending switch CD has taken to find the bank contact set including the contact 561. It will be assumed that this bank contact set selected by the connector H—1 includes the contact 640.

As the wipers of the connector H—1 have been rotated past the normal set of bank contacts, the original energizing circuit of the slow-releasing relay 604 is opened. However, the relay 604 does not become deenergized until the termination of the first series of impulses. This result is due to the fact that, at each retraction of the armature of the line relay 607, a circuit is closed for the relay 604 from ground over armature 617 and its front contact, to the winding of the relay 604, armature 615 and its front contact and the back contact and armature 620 to battery and ground.

By the deenergization of the relay 604 at the end of the first series of impulses, the circuit of the slow-releasing relay 601 is opened at the armature 614, and a circuit is closed at the armature 616 which extends from the battery, by way of the conductor 662, through the winding of the relay 708, the conductor 651, the bank contact 640, the wiper 630, the front contact and the armature 608, and the front contact and the armature 617 to ground. The relay 708 is energized over this circuit and operates to open the locking circuits of the certain relays in the group RG—5 at the armature 725, to close its locking circuit at the front contact of the armature 725 to ground on the conductor 650, which has been grounded previously by the operation of the relay 606. Other results of the energization of the relay 708 are that at the armature 726, a selecting circuit is prepared, and at the armature 728, a circuit is closed extending from ground by way of the armature 609 and its front contact, the conductor 659, the armature 728 and its front contact, and through the winding of the relay 738 to the battery. The relay 738 is energized over this circuit and controls certain circuits that will be described later.

Returning now to the operation of the code sending switch CD,—1 when the wipers 555 to 558, inclusive, are brought into engagement with the bank contact set which includes the contact 563, as previously described, a circuit is completed which extends from ground by way of the armature 427 and its front contact, the front contact and the armature 424, the common conductor 462, the wiper 512, the bank contact 516, the conductor 461, the armature 430 and its front contact, the conductor 466, the bank contact 563, the wiper 556, and through the winding of the relay 502 to battery.

The relay 502 is energized over the above circuit and operates, as before, to open the circuit of the stepping magnet 534 at the armature 506 and to open the circuit of the slow-releasing relay 532 at armature 507. The slow-releasing relay 532 is deenergized to open the circuit of the slow-releasing relay 531, which also retracts its armature. As a result of the latter operation, the stepping magnet 534 is operated to open the circuit of the interrupter relay 533, which retracts its armature to open the circuit of the stepping magnet 534. The magnet 534 is thus deenergized to advance the switch wipers 555 to 558, inclusive, into engagement with the next set of bank contacts. As a result of this operation, the circuit of the relay 502 is opened and this relay retracts its armatures.

The deenergization of the relay 502 opens the circuit of the stepping magnet 534 and closes a circuit for the slow-releasing relay 532. The relay 532 is energized and operates to establish a circuit for the relay 531. The latter relay, upon being energized, reestablishes the circuit of the stepping magnet 534. The stepping magnet 534 now intermittently operates to advance the wipers 555 to 558, inclusive, until they are brought into engagement with the twenty-fifth set of bank contacts.

During the second advancement of the wipers of the code sending switch, each time the stepping magnet 534 operates, the circuit of the repeating relay 501 is opened and this relay retracts its armature to produce a corresponding number of interruptions in the circuit of the line relay 607 of the connector H—1. Upon each retraction of the armature 620 of the relay 607, the circuit of the stepping magnet 623 is opened and the magnet operates to advance the wipers 630 to 633, inclusive, into engagement with the bank contact set which corresponds to the number of impulses sent over the trunk line, as determined by the second movement of the wipers of the code sending switch CD—1. It will be assumed that this contact set includes the bank contact 641.

When the wipers of the connector H—1 are brought into this position, no more impulses are sent over the trunk line until the slow-releasing relays 533 and 532 of the code sending switch CD—1 are deenergized. During the advancement of the switch wipers to their second position, when the wiper 631 engages the twelfth, thirteenth and fourteenth set of bank contacts, a circuit is completed for the relay 603 from ground over armature 617 and its front contact to the winding of the relay 603, and over the twelfth, thirteenth and fourteenth contacts, 642, 643 and 644 respectively, to the wipers 631 and battery to ground. The relay 603, upon being energized, closes a circuit for the slow-releasing relay 601 at the armature 611 from ground over armature 617 and its front contact to the winding of the relay 601, armature 611 and its front contact and battery to ground, at the armature 612 prepares a circuit for maintaining itself energized from ground over armature 617 and its front contact to the winding of the relay 603, armature 612 and its front contact and the back contact and armature 620 to battery and ground, and at the armature 613 removes battery from the conductor 661. As a result of the pause in the transmission of impulses, the slow-releasing relay 603 in the connector H—1, which has been maintained energized by the operation of the armature 620 of the line relay 607, retracts its armatures, thereby opening the circuits of the slow-releasing relay 601 at the armature 611 and, at the armature 613 completes a circuit which extends from the battery by way of said armature and its back contact, the conductor 661, through the winding of the relay 705, the conductor 657, the bank contact 641, the wiper 630, the front contact and the armature 608 to ground by way of the front contact and the armature 617. The relay 705 is energized over this circuit and operates to establish a locking circuit for itself at the armature 719, and to prepare a circuit at the armature 720 for short-circuiting the relay 700.

As previously described, the code sending switch CD—1 is stepped around to its twenty-fifth position after the termination of the second series of impulses. The wipers of the connector switch H—1 are also stepped in synchronism with the wipers of the code sending switch CD—1 and are brought to rest in engagement with their twenty-fifth set of contacts.

In the code sending switch CD—1, the operation of the wipers 555 to 558, inclusive, to their twenty-fifth set of bank contacts opens the circuit of the relay 527 and also the energizing circuit of the slow-releasing relay 525. The relay 527 immediately retracts its armature. By reason of the peculiar construction of the armature 539, previously described, this armature vibrates for an interval of time, thus alternately closing the circuits of the slow-releasing relays 526 and 525. For the reason explained previously, the relay 525 is the first to retract its armature. The deenergization of the relay 525 prepares a circuit for the relay 503.

Another result of the switch wipers of the code sending switch CD—1 being brought into engagement with the twenty-fifth set of bank contacts is that a circuit is completed extending from ground by way of the wiper 555, the bank contact 560, and through the winding of the relay 529 to battery. The relay 529 operates to open another point in the energizing circuit of the relay 525 at the armature 544 and to close the circuit of the relay 503. Upon being energized, the relay 503 operates to establish another circuit for the relay 528 at the armature 508 and to close a circuit at the armature 507 which extends from ground by way of the said armature and its front contact, the wiper 511, the bank contact 515, the conductor 460, and through the winding of the resistor 431 to battery. This circuit serves to short-circuit the relays 420 and 421. Consequently, these relays retract their armatures. The relay 420, upon retracting its armatures, opens its locking circuit at armature 423, also removes ground from the common conductor 462 at the armature 424, and at the armature 425 removes one ground connection from the conductor 464. The deenergization of the relay 421 causes this relay to open its locking circuit at the armature 426 and to restore certain other circuits to normal.

In the connector H—1, the relay 602 is deenergized, an interval after the wipers of the code sending switch CD—1 engage the twenty-fifth set of bank contacts. Upon retracting its armature, the relay 602 closes a circuit which extends from ground by way of the back contact and the armature 610, the conductor 660, the armature 726 and its front contact, the front contact and the armature 720, and through the winding of the resistor 712 to battery. This circuit serves to shunt out the relay 700 which retracts its armature. The latter operation opens the circuit of the supervisory lamp 715 and closes a circuit for the supervisory lamp 717. By reason of these changes in supervisory signals, the dispatcher is apprised of the change in position of the contactor 445 in the substation.

Returning now to the operation of the code sending switch CD—1, the slow-releasing relay 526 is finally deenergized and it opens the circuit of the relay 501 at the armature 537 and, at the armature 538, it opens the circuit of the relay 530. The deenergization of the relay 530 opens the circuit of the slow-releasing relay 532 at the armature 546 and, at the armatures 547 and 548, completes a circuit which extends from ground by way of the armature 548 and its back contact, through the winding of the stepping magnet 534, the armature 547 and its back contact, the twenty-fifth bank contact, with which the wiper 558 is in engagement, and the said wiper, and thence to the battery by way of the back contact and the armature 552. The stepping magnet 534 is energized over this circuit and operates to restore the wipers 555 to 558, inclusive, to their normal positions, whereupon the circuit of the magnet 534 is opened and its operation ceases.

As a result of the wipers of the code sending switch being brought to their normal position, the circuit of the relay 529 is opened and this relay retracts its armatures to open the circuit of the relay 503. The slow-releasing relay 532, upon retracting its armature, opens the circuit of the slow-releasing relay 531 which is also deenergized. The relay 503, upon retracting its armatures, opens the circuit of the relay 528 at the armature 508 and, at the armature 507 removes the shunt from the circuit of the relay 421. It will be remembered that the relay 422 is now in an operated position and, consequently, the relay 421 is energized to establish a locking circuit for itself at the armature 426. The operation of the other armatures of the relay 421 is without effect at this time as the relay 420 is inert. The deenergization of the relay 528 in the code sending switch CD—1 merely restores certain circuits to their normal condition. The deenergization of the relay 501, which occurred immediately after the deenergization of the slow-releasing relay 526, opens the circuit of the line relay 607 of the connector H—1.

As the circuit of the relay 607 is opened, this relay is deenergized to open the circuit of the slow-releasing relay 605. Upon retracting its armatures, the relay 605 closes a circuit for the stepping magnet 623 which extends from battery by way of the wiper 632 of the twenty-fifth bank contact, the back contact and the armature 624, the back contact and the armature 618, and through the winding of the stepping magnet 623 to ground. The stepping magnet 623 operates to restore the wipers 630 to 633 to their normal position.

In the above manner, the apparatus is released following the sending of the supervisory signal to the dispatcher, notifying him of the automatic operation occurring in the substation.

It will be noted that the supervisory signal 717 is not actuated immediately after the two series of impulses which caused its selection. As was described above, although the operating circuit for shunting the relay 700 was prepared before the wipers reach their twenty-fifth contact, this circuit was not completed, due to the fact that the relay 602 which controls the final operating circuit over the armature 610 was maintained energized and the operating circuit was, therefore, not completed until the wipers were in engagement with their twenty-fifth contact. It is operated when the wipers of the connector H—1 are brought into their twenty-fifth position and remain there an interval. By this circuit arrangement, false operation of the supervisory signals is prevented, because, should either the switch CD in the substation or the connector H—1 in the dispatcher's office get out of synchronism with the other, the wipers of each of the switches will not be in their twenty-fifth position simultaneously. Consequently, the supervisory signal will not be operated and the answer back operation will start all over again.

As will be clear from the operations described above, the supervisory operating circuit is completed over the armature 610 of the relay 602 so that the completion of the prepared circuit depends upon the deenergization of the relay 602. An energizing circuit, however, is normally completed for the relay 602 over the first twenty-four contacts of wiper 633 and the armature 617 of the relay 605. The relay 605, being slow to operate, is normally maintained energized during the periods while the signalling lines 591 and 592 are open and relay 607 is deenergized. During the first and second pauses, while the relays 607 and 605 are energized, relay 602 remains energized. When, however, the switch CD—1 reaches its twenty-fifth contact and the third pause occurs, if the wipers 630 to 633 of switch H—1 are in synchronism with the wipers of switch CD—1 at the remote station, and are, therefore, on their twenty-fifth contact, the energizing circuit for the relay 602 is opened at the wiper 633. This pause is sufficiently long to deenergize relay 602. Upon deenergization of the relay 602, the armature 610 engages its back contact and the operating circuit is completed. This is the normal operation.

In the event, however, that the switch H—1 lags behind the switch CD—1, when the switch CD—1 reaches its twenty-fifth contact, a pause will occur as described above. The switch 633 will not, at this time, be in engagement with its twenty-fifth contact, but rather on some preceding contact so that the circuit for relay 602 is not opened at this time and the relay 602 remains energized, thus failing to complete the supervisory circuit. At the completion of the pause period, the switch CD—1 is restored to normal, thereby deenergizing the relay 607. The relay 605 will, thereupon, be deenergized and will, in turn, open the energizing circuit for the relay 602 at the armature 617. The relay 602, however, being slow to deenergize, holds its armature up for some interval of time thereafter. In the meanwhile, however, an energizing circuit is completed for the stepping magnet 623, over the armatures 618 and 624, and the wiper 632, to battery and ground, completing a vibrating circuit which steps the wipers 630 to 633 from contact to contact until they are restored to their normal positions. As soon as all of the switches are restored to normal, the circuit for relay 606 is opened at the first contact of the wiper 632 and this relay is deenergized and, in turn, opens the locking circuit of the selecting relays in the groups RG—4 and RG—5 at the armature 619 without completing the supervisory circuit.

On the other hand, in the event that the switch H—1 is ahead of the switch CD—1, when H—1 reaches its twenty-fifth contact, there will not be a pause of sufficient duration to deenergize relay 602 as described above and, on the next step of the switch H—1, the locking circuits for the selecting relays in the groups RG—4 and RG—5 will be opened. The pause then occurring will not close the prepared supervisory circuit. The dispatcher hearing the buzzer but noting that no change in signal lamps has occurred, will thereupon transmit a checking code described hereinafter.

In the event of an operation by the dispatcher, wherein the supervisory operation is not completed for reasons described above, the operating code will be repeated and the relays 420 or 421 will be reenergized to repeat the code, as described hereinafter.

In the same manner as above described, any change in position of any of the contactors, or other apparatus units, causes the finder switch F—1, Figure 5, the code sending switch CD—1 and the connector H—1 to be operated to control the actuation of the supervisory signal.

Special provisions have been made whereby the load dispatcher is apprised of the load on the substation. This arrangement comprises a Kelvin balance ammeter K which is connected to an ammeter shunt in the main bus 440 of the substation. The Kelvin balance operates in a well-known manner to shift the contactor 433 in various positions in accordance with the load on the substation.

In order to briefly describe the operation, it will be assumed that the contact maker 433 has been placed in connection with the contact 450. This operation closes a circuit for the relay 450. Upon operating, the relay 450 at the armature 454 establishes a circuit for the relay 452 and, at its other armature, also places potential upon the proper bank contact in the code sending switch CD—1. It will be noted that, while the relay 450 was in a de-energized condition, the circuit of the relay 451 was closed and this relay became energized to establish a locking circuit for itself and to prepare certain other circuits as will appear. The relay 452, upon being energized, closes the starting circuit for the finder switch F—1 in the same manner as the relay 420 or 421, as before described. These operations cause the functioning of the finder switch F—1, the code sending switch CD—1 and the connector H—1 in the usual manner. By these operations, certain relays in the relay group RG—4 and group RG—5 are energized and locked in that position. It will be assumed that these relays are the relays 710 and 706. When the group selecting relay 710 of the first selecting group RG—5 is energized, a circuit is momentarily closed by the operation of the relay 601 of the connector H—1 for the relay 738 in a manner before described. The relay 738, upon operating, opens up the locking circuit of that one of the relays, such as the relays 735, 736 and 737, which may be energized, thus causing this relay to retract its armatures. This operation opens the circuit of a certain load indicating lamp which may be lit.

Now at the end of the selecting operation, when the wipers of the connector H—1 are in engagement with their twenty-fifth set of bank contacts, a circuit is closed in the usual manner for energizing the relay 735. This relay operates to establish a locking circuit for itself at armature 739 and, at the armature 740, closes a circuit for the load indicating lamp 750. This lamp will now continue to burn, indicating to the dispatcher that there is a certain load on the substation until a change in voltage occurs, whereupon it is extinguished by a code being sent back and another lamp lighted. The completed circuit for the relay 738 is shown diagrammatically, as it will be understood by those skilled in the art that the relay can be arranged to energize only when a new code is received in response to a change in load. The operation of the alarm relay 770, of course, calls the attention of the load dispatcher to the change in voltage in the same manner as has been before described. The dispatcher then operates the key K—1 to stop the operation of the alarm.

Whenever any change in voltage occurs across the busses 440 and 441 at the substation, the contact maker 433 on the Kelvin balance K is operated to open the circuit of the relay 450 and to close the circuit for a relay similar to it. It will thus be seen that there is a group of relays, such as relays 450, 451 and 452, provided with each contact of the contactor 433 in the Kelvin balance. These relays operate in a slightly different manner from the relays, such as relays 420, 421 and 422, which are associated with the other apparatus units and contactors in the substation.

It will now be assumed that the contactor 445 at the substation is open and that the load dispatcher desires to close it. In order to accomplish this result, the dispatcher will operate the double-throw key K in a direction to close the springs shown on the right.

When the key is thrown, a circuit is closed which extends from ground by way of spring 103 and its working contact, through the winding of the stepping magnet 109 of the finder switch F, the armature 132 and its back contact, and thence to battery, by way of back contact and the armature 120. As the stepping magnet 109 interrupts its own circuit, it operates as a buzzer to advance the switch wipers 123 to 126, inclusive, until they are brought into engagement with the set of bank contacts 127 to 130, inclusive, which are the contact set associated with the key K in the finder F.

When the switch wipers are brought into engagement with this set of bank contacts, a circuit is closed which extends from ground, through the coil of the relay 108, by way of the common conductor 134, which is common to all the keys in the group, the spring 101 and its working contact, the bank contactor 130, the wiper 126, and the coil of the relay 113 to battery. The relay 113 is energized over the circuit and, upon operating, opens the circuit of the stepping magnet 109, thus stopping the operation of the finder switch, and closes a circuit for the relay 111 extending from battery by way of the armature 120 and its front contact, through the coil of the relay 111, the bank contact with which the wiper 160 is in engagement, and the said wiper to ground, at armature 121 closes a circuit which extends as follows: From ground by way of the armature 121 and its front contact, through the coil of the slow-releasing relay 143, and thence to battery by way of the armature 152 and its back contact. The relay 111, upon being energized, closes a circuit for the slow-releasing relay 110 at its armature 117.

The armature 117 of the relay 111 is constructed in a manner similar to the relay 527 of the code sending switch CD—1 and, consequently, when the relay becomes deenergized, the armature 117 vibrates for an interval afterwards. The relay 110, upon operating, at the armature 115 closes a circuit for the relay 140 and, at the armature 116, establishes a circuit which extends from ground by way of the armature 121 and its front contact, through the coil of the repeating relay 144, the front contact and the armature 116 and to battery by way of the armature 152 and its back contact. The repeating relay 144, upon operating, at its armature 154, closes a bridge across the conductors 180 and 181 extending to the substation whereby the line relay 200 of the connector H is energized.

The line relay 200, upon operating, closes a circuit for the slow-releasing relay 202 in multiple with the stepping magnet 207. The stepping magnet 207 is energized to place its associated pawl in position to actuate the switch shaft. The slow-releasing relay 202, upon being energized, closes a circuit for the slow-releasing relay 203. The latter relay operates to energize the slow-releasing relay 206. The operation of these relays have the same functions as described in connection with the connector H—1.

Returning now to the operation of the code sending switch CD, the relay 140, upon operating, at its armature 148 closes a circuit for the slow-releasing relay 141. The relay 141, upon attracting its armature, establishes a circuit for the slow-releasing relay 142. The latter relay, upon being energized, closes a circuit which extends from ground by way of the armature 155 and its back contact, the front contact and the armature 151, the front contact and the armature 153, through the coil of the magnet 146, by way of the wiper 162 and its associated bank contact, and thence to battery by way of the armature 148 and its front contact. The stepping magnet 146 is energized over this circuit and operates to place its associated pawl in position to actuate the switch shaft and also to open the circuit of the relays 144 and 143 at the armature 152. The deenergization of the relay 144 opens the circuit of the line relay 200 of the connector H at the substation. The slow-releasing relay 143, upon being deenergized, opens the circuit of the stepping magnet 146, which is also deenergized, to reestablish the circuit of the relays 143 and 144, and to advance the switch wipers 160 to 163, inclusive, into engagement with their first set of bank contacts. The stepping of the code sending switch CD continues under the control of the slow-releasing relay 143 until the wipers of the switch are brought into engagement with the contact set which includes the contact 165. When this occurs, a circuit is completed which extends from ground by way of the spring 102 of the key K and its working contact, the wiper 125, the bank contact 129, the bank contact 165, the wiper 161, and through the coil of the relay 145 to the battery.

The relay 145 is energized over this circuit and, upon operating, it opens the circuit of the stepping magnet 146 at the armature 155, at the front contact of this armature prepares another circuit for the magnet and at the armature 156 opens the circuit of the slow-releasing relay 141. The rotation of the switch, of course, ceases.

The slow-releasing relay 141, upon being deenergized, opens the circuit of the slow-releasing relay 142. After a short interval, the slow-releasing relay 142 retracts its armature and closes a circuit which extends from ground by way of the armature 155 and its front contact, the back contact and the armature 151, the front contact and the armature 153, through the coil of the stepping magnet 146, the wiper 162 and the bank contact with which the said wiper is in engagement, and thence to battery by way of the front contact and the armature 148. The stepping magnet 146 operates to attract its armature, thereby placing the pawl in actuating position and opening the circuit of the slow-releasing relay 143 and also the circuit of the relay 144.

In accordance with the first operation of the code sending switch CD, a series of interruptions is produced in the circuit of the line relay 200 of the connector H. This relay is deenergized a plurality of times in response thereto. As a result of the retractions of the armature 209, the circuits of the slow-releasing relay 202 and the magnet 207 are opened. The deenergizations of the magnet 207 serve to advance the switch wipers 225 to 228, inclusive, in engagement with the bank contact set which corresponds to the number of impulses sent over the trunk line and, consequently, the position of the wipers 160 to 163, inclusive, of the code sending switch CD. At the first off-normal step of the switch, the relay 201 is energized and grounds the conductor 260. It will be assumed that the bank contact set to which the wipers 225 to 228, inclusive, are stepped includes the bank contact 230.

During the interval that the slow-releasing relays 141 and 142 in the code sending switch are being deenergized, the slow-releasing relay 203 of the connector H, which has been maintained energized by the continued operation of the armature 209 is deenergized. As a result of this operation, a circuit is completed which extends from ground by way of the armature 211 and its front contact, the armature 221 and its front contact, the wiper 225, the bank contact 230, the conductor 262, through the coil of the relay 306, the conductor 271, and to battery, by way of the armature 215 and its back contact. The relay 306 is energized over this circuit and operates to close a locking circuit for itself at the armature 322 to ground on the conductor 260.

Adverting to the operation of the code sending switch CD, the deenergization of the slow-releasing relay 142 closes a circuit for the magnet 146 which is energized to place its associated pawl in actuating position and to open the circuit of the slow-releasing relay 143 and also the circuit of the repeating relay 144. The slow-releasing relay 143, upon being deenergized, opens the circuit of the stepping magnet 146, which is deenergized. The retraction of the armatures of the magnet 146 advances the switch wipers another step and also closes the circuit of the interrupting relay 143 and the repeating relay 144. By the movement of the switch wipers, the circuit of the relay 145 is opened and this relay retracts its armatures to open the circuit of the magnet 146 and to close the circuit of the slow-releasing relay 141. The energization of the relay 141 closes the circuit of the relay 142.

The operation of the relay 142 again starts the operation of the stepping magnet 146. The magnet 146 is now intermittently operated to advance the wipers 160 to 163, inclusive, into engagement with the bank contact set, which includes the contact 166. A circuit is now closed which extends from ground by way of the spring 102 of the key K and its working contact, the armature 119 of the relay 108 and its front contact, the wiper 124, the bank contact 128, the bank contact 166, the wiper 161, and through the winding of the relay 145 to battery. The relay 145 is energized to momentarily stop the operation of the switch wipers in the same manner as before described.

The repeating relay 144 operates to interrupt the circuit at the line relay 200 of the connector H in the same manner as before. The line relay 200 operates to control the operation of the stepping magnet 207 in advancing the wipers 225 to 228, inclusive, into engagement with the proper bank contact set, which, it will be assumed, includes the bank contact 231. At the termination of this series of impulses, the slow-releasing relay 204, which has been energized while the switch wipers were being rotated past the twelfth, thirteenth and fourteenth set of bank contacts and has been maintained energized by the operation of the line relay 200, becomes inert and a circuit is closed which extends from ground by way of the front contact and the armature 211, the armature 221 and its front contact, the wiper 225, the bank contact 231, the conductor 268, through the winding of the relay 303, the conductor 270, and the armature 219 and its front contact to battery. The relay 303 is operated over this circuit and attracts its armatures to establish a locking circuit for itself at the armature 350 and to prepare a circuit at the armature 319 for the relay 404 in the substation.

Going back now to the operation of the code sending switch CD, the slow-releasing relays 141 and 142 operate, as before, and the magnet 146 is operated after an interval to advance the wipers 160 to 163, inclusive, into engagement with the twenty-fifth set of bank contacts.

When the wipers 160 to 163, inclusive, are brought into engagement with the twenty-fifth set of bank contacts, the circuit of the stepping magnet 146 is opened and its operation ceases temporarily. A circuit is also completed which extends from ground by way of the wiper 160 and its associated twenty-fifth bank contact, and through the winding of the relay 112 to battery. The relay 112 is energized to prepare a circuit for the stepping magnet 109, the function of which will be described subsequently. Another result of the rotation of the wipers to the twenty-fifth position is that the circuit of the relay 111 is opened. The relay 111 is immediately deenergized to cause its armature 117 to vibrate. The relay 110 is thus maintained energized for an interval after the relay 111 is deenergized. In the same manner as before described, the wipers of the connector H are brought into engagement with their twenty-fifth set of bank contacts. Now, during the interval that the relay 110 in the dispatcher's office is maintained energized, due to the operation of the wiggle tail armature 117 the slow-releasing relay 205 in the connector H at the substation is deenergized and a circuit is completed which extends from battery by way of the back contact and the armature 220, the conductor 269, the conductor 372, through the winding of the relay 404, the conductor 371, the armature 319 and its front contact, and thence to ground, by way of the front contact and the armature 323. The relay 404 is operated over this circuit and closes a circuit at its armature 416 for the contactor 445 and, at the armature 415, closes a circuit for the relays 420 and 421. The circuit for the relay 421 is completed from ground through the winding of the relay 421, over armature 415 and its front contact, over the back contact and armature 429 through the battery and ground. In the event the relay 422 had been energized at this time for a reverse operation, the relay 420 would have been energized over a circuit from ground to the winding of relay 420, over the front contact and armature 415 and the front contact and armature 429 to the battery to ground.

As the contactor 445 has been assumed to be open, its energization serves to close it. In the same manner as before described, the dispatcher receives a supervisory signal back in order to notify him that the desired operation has taken place.

There is slight difference in the operation in this instance, however, and that is, inasmuch as the key K is operated when the supervisory lamp 717 is lighted, a circuit is also closed, which extends from the battery, by way of the armature 713 and its back contact, the conductor 182, through the winding of the release relay 105, and thence to ground, by way of the working contact of the spring 100 of the key K and the said spring.

The operation of the release relay 105 serves to withdraw a catch 137 of any well known type so that the key assumes its normal position. In this manner, the operating code is not transmitted again. With the key still in its position shown, and the remaining apparatus restored to normal in the manner described above, the relay 109 is again energized and opens its own circuit to step the wipers from contact to contact in the manner described above. The switch wipers then stop at the position individual to the key K and start the code sender in the manner described above for transmitting a code combination of impulses individual to the operated key.

The contact 415 on the relay 404 is provided so that, in case the contactor 445 should already be in a closed position, an answer back signal will be given to the dispatcher in order to check the supervisory signals. As was pointed out in the above, either the relays 420 or 421 will energize when the armature 415 engages its front contact, the particular relay energizing depending upon the position of the armature 429, that is, whether the relay 422 is energized or deenergized. As a result of the energization of either relay 420 or 421, a supervisory code will be transmitted in the manner described in detail above and a check is thus provided to apprise the dispatcher of the condition of the unit.

The automatically released key K also provides means so that if, for some reason or other, the code is not transmitted correctly, the operation will occur repeatedly until the corresponding contactor or apparatus unit is operated in the substation. By the conjoint action of the checking contacts 415 of the relay 404 and the release coil on the key K, provision is made so that, if the answer back code is not transmitted properly, it will be repeatedly sent back until the proper indication is given to the load dispatcher.

Returning now to the operation of the code sending switch CD, it will be remembered that the circuit of the slow releasing relay 110 is finally opened by the cessation of the vibration of the armature 111. The relay 110, upon being deenergized, opens the circuit of the slow-releasing relay 140 at the armature 115, at the armature 116 opens the circuit of the relay 144, and at the armature 114 closes a circuit, which extends from the battery, by way of the front contact of the armature 118 and the said armature, the armature 114 and its back contact, the back contact and the armature 132, through the winding of the stepping magnet 109, the working contact of the spring 103 of the key K and the said spring to ground. The magnet 109 is operated over this circuit to advance the wipers 123 to 125, inclusive.

The slow-releasing relay 140, upon being deenergized, opens the circuit of the slow-releasing relay 141 and closes a circuit which extends from ground by way of the armature 147 and its back contact, through the winding of the stepping magnet 146, the armature 149 and its back contact, the bank contact with which the wiper 163 is in engagement and the said wiper, and thence to battery, by way of the armature 152 and its back contact. The magnet 146 operates to restore the wipers 160 to 163, inclusive, to normal position. By this operation, the circuit of the relay 112 is opened and this relay is deenergized to open the circuit of the stepping magnet 109 of the finder switch F whereby the rotation of the wipers of the finder switch ceases. The slow-releasing relay 141, upon retracting its armature, opens the circuit of the slow-releasing relay 142, which is also deenergized. In the above manner, the connection is released responsive to transmitting of the sending operation.

The reason that the finder switch F is given a number of steps at the end of the code transmitting operation is to allow the calls to be evenly distributed over the group of keys. To explain more fully, assuming that another key is operated in addition to the key K, were it not for the provision mentioned, the code corresponding to the key K would be transmitted indefinitely until the proper answer back signal would be recorded on the lamps, and there would be no actuating code sent out for the other key, which was operated. By means of the circuit arrangement shown, this difficulty is obviated and one transmitting operation cannot indefinitely tie up the remaining.

The relay 113, of course, is deenergized as soon as the switch wiper 126 is rotated from engagement with the bank contact 130 and the circuit of the stepping magnet 109 is closed. If no other key is operated, the finder switch F may again rotate the wipers 123 to 126, inclusive, into engagement with the bank contacts 127 to 130, inclusive.

In case the dispatcher operates the key K in the other direction, thus operating the spring shown in the left, the code for opening the contactor is sent out, although the wipers 123 to 126, inclusive, of the finder switch F are brought into engagement with the bank contacts 127 to 130, inclusive. The difference in the code is due to the fact that the common relay 108 is not energized at this time, and consequently, the wipers of the code sending switch CD are first stopped in engagement with the bank contact set which includes the contact 164.

This code received at the substation operates a relay similar to relay 404 which, in turn, controls a magnet such as 461', similar to magnet 445, which trips the breaker as shown.

The dispatcher is also provided with a checking key whereby it is possible for him to send out a certain code which will operate the relays 401, 402 and 403. These relays carry contacts for closing the circuits of all relays, such as relays 420 and 421, in the substation. Consequently, when the checking code is sent out, all the apparatus units codes will be sent back to the dispatcher in order to check his supervisory signals.

Under certain conditions, it will be seen that it may be desirable to operate a plurality of contactors, or other apparatus units, in the substation simultaneously in order to take care of standard operations or emergency conditions. To this end, we have provided a relay 435 which is adapted to close circuits at the armatures 432, 433, 434 for the contactors that it is desired to operate. The relay 435 is energized in the same manner as the relay 404. The operation of this relay and the contactors controlled by it will be apparent without further explanation.

Figure 9:
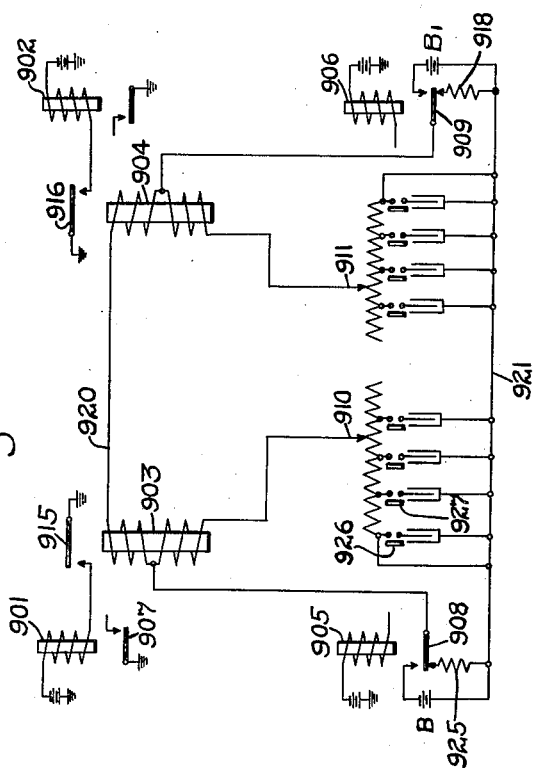
Fig. 9 shows the means we employ for simultaneously sending impulses in both directions over a two-conductor trunk line.

It will be seen that there has been shown in the system so far described a trunk line comprising four conductors extending between the dispatcher's office and the substation. These conductors may be cut down to two by using the method illustrated in Fig. 9. This circuit arrangement discloses a duplexing method whereby signals may be sent simultaneously over two conductors in either direction. Its operation is somewhat similar to that of the ordinary differential duplex used in telegraph systems. The relays 905 and 906 are repeating relays in the code sending switches CD—1 and CD, respectively, and the relays 901 and 902 represent the line relays of the connector switches H—1 and H, respectively.

With the above understanding, the operation is as follows: When the relay 905 is operated, a circuit is closed extending from the negative pole of the battery B by way of the front contact and the armature 908 through the upper winding of the differential relay 903, through the trunk conductor 920, through the upper winding of the differential relay 904, the armature 909 and its back contact, the resistor 918, the trunk conductor 921, and thence to the positive pole of the battery B. A circuit in multiple with the above extends through the lower winding of the differential relay 903, through the contact maker 910, and thence to the positive pole in the battery B. The circuits above mentioned for the upper and lower windings of the differential relay 903 are balanced by means of a contact maker 910 and the switches such as 926 and 927 so that there is an equal current flowing in both windings and the relay 903 does not energize. However, at the receiving station, the relay 904 is energized, as practically all the current goes through the upper winding 904. Whatever portion is shunted through the lower winding flows in such direction as to assist current in its upper winding. The relay 904 is thus caused to attract its armature 916 and to close a circuit for the line relay 902 of the connector.

The relay 902 is thus actuated to control the connector in accordance with the impulses produced by the operation of the repeating relay 905. Likewise, the operation of the repeating relay 906 controls the operation of the receiving relay 901 of the connector in the same manner.

Now assuming that both the relays 905 and 906 are energized simultaneously, the current flows over the circuit above traced including the upper windings of the relays 903 and 904 and the trunk conductor 920, and also through the lower windings of the relays 903 and 904. The currents through the upper windings of these relays neutralize each other. Consequently, the lower windings of these relays operate to attract the armature 915 and 916. Thus, the operations of the armatures 916 and 915 serve to control the connector line relays 902 and 901 to produce the desired operations.

By the arrangement shown in Fig. 1, it is only possible to select a maximum of twenty-five keys, thus providing for fifty operations at the substation. In the event that it is desired to form more than fifty operations, or to supervise more than fifty operations at the substation, some special provisions must be made. Fig. 10 shows the means for accomplishing the desired result. The apparatus shown comprises three finder switches F—5, F—6 and F—7. Only that portion of the circuits has been shown which is necessary in order to explain the operation. It will be seen that, when the key K—3 is thrown (this key corresponding to the key K), a circuit is closed which extends from ground through the working contact and the spring of key K—3 by way of the armature 963 and its back contact, the armature 966 and its back contact, the armature 969 and its back contact, the back contact and the armature 958, and through the winding of the stepping magnet 951 of the finder switch F—5 to battery. The finder switch F—5 is thus rotated in search of the key operated.

If the leads of the key do not appear in its bank, the rotation of the wiper continues until engagement is made with the twenty-fifth set of bank contacts, whereupon a circuit is closed for the relay 950. The relay 950 is energized to open the circuit of the stepping magnet 951 and to close the circuit of the stepping magnet 954. The stepping magnet 954 now intermittently operates to rotate its wipers including the wiper 960 in search of the leads extending to the key K—3. If the leads of the key are not in its bank upon engagement being made with the twenty-fifth bank contact, a circuit is completed for the relay 952 and this relay is energized to close the circuit of the stepping magnet 955 and to open the circuit of the relay 950. The latter relay is deenergized to open the circuit of the stepping magnet 954. The stepping magnet 955 of the finder switch F—7 operates the finder switch wipers in search of the leads extending to the key, such as K—3, operated. As the leads extending to the key will have to be in this bank, as they were not in any others, the wipers of the finder switch F—7 are stopped in the proper position. Upon a subsequent call, the finder switch F—7 will be the first one to be operated. The same sequence of operations occurs in searching for any operated key. The finder switch, which finds the leads extending to the operated key, stops in that position and starts from there in searching for the first subsequently operated key. By using the principles illustrated, it is possible to increase the capacity as desired.

By the arrangement shown in Figs. 1 to 7, inclusive, it is necessary to provide, in case there are several substations in the system, a separate sender for each substation at the dispatcher's office. By means of the circuit arrangement shown in Fig. 8, it is possible to use one sender switch which is adapted to be associated with the trunk line extending to any one of a number of substations. This apparatus comprises a finder switch F—2 in addition to the ordinary key finder which is shown at F—3. The dispatcher is provided with a group of keys for each substation. Each key, of course, controls a certain particular apparatus unit in one of the substations. In order to describe the operation of this arrangement, it will be assumed that the dispatcher operates a key K—3 in a group extending to the first substation. This operation closes a circuit for the relay 805 which is immediately energized. Upon operating, the relay 805 closes a circuit for the magnet 807. The magnet 807 intermittently operates to advance the finder switch wipers 829 to 845, inclusive, in search of the group in which the key K is located. It will be understood that there is a relay 805 provided for each group of keys.

When the wipers of the finder F—2 are brought into engagement with the bank contacts 870 to 873, inclusive, a circuit is closed extending from ground by way of the armature 824 and its front contact, the bank contact 870, the wiper 829, and through the winding of the relay 806 to battery. The relay 806 immediately operates to open the circuit of the stepping magnet 807 and to close the circuit for the stepping magnet 803 of the key finder. By the positioning of the wiper 845 of the finder switch F—2 on the bank contact 873, a circuit is closed for the substation selecting relay 800. The substation selecting relay 800 operates to place the trunk line comprising the conductors 859 and 860 leading to the first substation in connection with the dispatcher's office. The other wipers 830 and 831 shift certain connections of the relay 809 and resistor 849, which correspond to the relay 108 and the resistor 107 associated with the finder switch F in Fig. 1. This shifting is done in order to prevent any false code being sent out by reason of more than one key in different groups being operated at the same time. The finder switch F—3 now operates to select the key in the usual manner. The remaining operations in sending the code and operating the apparatus units at the substation take place in the usual manner.

When the key K—3 is automatically released by reason of the answer back code being sent, the circuit of the relay 806 is opened and this relay is deenergized to restore certain circuits to normal. Also, the relay 805 is deenergized.

It will be seen that the provision of an automatically released key, such as K, also renders it impossible to send an unnecessary code for the reason that, if the dispatcher should inadvertently throw the key K in the same direction as it had been thrown just previously, the release electromagnet is immediately operated to release it. In this manner, the attention of the dispatcher is called to his mistake.

While the equipment at the substation has only been indicated in diagrammatic form and practically no circuits shown, it will be understood that any desired circuit breakers may be controlled, or any other apparatus units, in a well known manner.

The present invention is particularly applicable to the system of the type described in view of the many features which provide checking arrangements and rendering false operation of the equipment practically impossible.

Our invention is not limited to the particular arrangement of the apparatus described but may be variously modified without departing from the spirit and scope of our invention as set forth in the appended claims.

We claim as our invention:

1. In an electrical control system, comprising a control office, a substation, a trunk line extending from said control office to said substation, and keys at said control office divided into groups, the combination with two finder switches associated with said trunk line in said office, of means for operating a key in one of said groups, means responsive to the operation of said key for initiating the operations of said finder switches successively to hunt the key operated, and means controlled by the operation of one of said finder switches for sending impulses over said trunk line.

2. In an electrical control system, comprising a control office, a plurality of substations trunk lines extending from said office to said substations, and a plurality of keys at said control office, said keys being divided into groups equal in number to the number of substations, the combination with an automatic impulse sender associated with said keys, of means for operating a key in a certain one of said groups, means controlled by said key for causing said sender to be associated with the trunk line extending to the substation corresponding to the group in which said key is operated, and means controlled by said key for sending impulses over said trunk line.

3. In an electrical control system, comprising a control office, a substation, apparatus units in said substation, and a trunk line connecting said office and station, the combination with an automatic switch in said station associated with said trunk line means cooperating with said switch for controlling said apparatus units, an automatic sending device at said office associated with said trunk line, means for operating said sender to send two series of impulses over said trunk line means responsive to said impulse for controlling said switch, a timing device comprising a slow-acting relay and a quick-acting relay, said quick-acting relay having a vibratory armature and associated contact, means including said armature and said contact for closing the circuit of said slow-acting relay a plurality of times upon the deenergization of said quick-acting relay, and means for deenergizing said quick-acting relay at the end of said two series of impulses.

4. In a supervisory control system, a first station, a second station, apparatus units at said second station, normally non-operating means at said first and said second stations, means for starting one of said means, means controlled by the operation of said last-mentioned means for transmitting impulses from said first to said second station, means controlled by said impulses for operating the other of said means in synchronism with the first-mentioned one of said means, means including said synchronously operated means for conditioning one of said units for operation, means for checking the synchronism of said synchronously operated means and means automatically responsive to said checking for completing the operation of said conditioned unit.

5. In a supervisory control system, a first station, a second station, apparatus units at said second station, a step-by-step device at said first station, a step-by-step device at said second station, means controlled by one of said step-by-step devices for transmitting impulses from said first to said second station, means controlled by said impulses for operating the other of said step-by-step devices, means including said step-by-step devices for conditioning one of said apparatus units for operation and means for checking the positions of said synchronously operated means and completing said operation in response to the checking of synchronous operation of said means.

6. In a supervisory control system, a first station, a second station, apparatus units at said second station, step-by-step devices at said first station, step-by-step devices at said second station controlled by said step-by-step devices at said first station, means including said step-by-step devices for transmitting code combinations of impulses from said first to said second station, means responsive to said code combination of impulses for selecting one of said apparatus units for operation and means whereby said selected apparatus unit is operated only automatically in response to the synchronous operation of said step-by-step devices.

7. In an electrical control system, a first station, indicating means thereat, a second station, a circuit extending from said first station to said second station, a measuring device at said second station having a plurality of indicating positions greater than two, means responsive to the operation of said measuring device from one indicating position to another for transmitting a code combination of impulses of an invariably constant number over said circuit, said code being individual to the new indicating position of said measuring device, a code receiver responsive to said code, means controlled by said code receiver in accordance with the code received for operating said indicating means and means for counting the number of received impulses, said means operating in response to the receipt of the correct number of code impulses to effect the operation of said indicating means in accordance with the received code.

8. In a supervisory control system, a first station, a second station, apparatus units at said second station, normally non-operating distributors at the first and second stations, means, including the distributor at the first station, for transmitting code combinations of impulses to the second station individual to the apparatus units, means at the second station controlled by said second-station distributor for conditioning the apparatus units for operation, means at said second station responsive to the code combination of impulses for operating the second-station distributor in synchronism with the first-station distributor, and relay means operable only in the event of synchronous operation of the distributors at the first and second stations for operating the conditioned apparatus units.

9. In a supervisory control system, a first station, a second station, apparatus units at the second station, step-by-step devices at the first and second stations, means controlled by the step-by-step device at the first station for transmitting different predetermined code combinations of impulses to the second station, means controlled by said impulses for operating the step-by-step device at the second station in synchronism with the step-by-step device at the first station, means responsive to the operation of the step-by-step devices in accordance with the code combination of impulses transmitted for setting up an operating circuit for the apparatus unit corresponding to the code transmitted, and means controlled by the step-by-step device at the second station for automatically completing the operating circuit only in the event of the synchronous operation of the step-by-step devices at both stations.

10. In a supervisory control system, a first station, a second station, a plurality of apparatus units at the second station, means at said first station for transmitting a code of impulses to said second station, means at said second station controlled by said impulses, said means at the second station being caused to operate in synchronism with the first station means by said impulses, means for conditioning one of said units for operation responsive to said received code, means for checking the synchronism of said first and second station means, and means whereby said operation is completed only if said means at said first station and said second station have maintained synchronism, said last mentioned means operating automatically in response to the checking of the synchronism of said first and second station means.

In testimony whereof, we have hereunto subscribed our names this 16th day of May, 1923.

ROY J. WENSLEY.
JAMES L. McCOY.